Dec. 31, 1963  A. L. JOHNSON  3,115,804
SNAP BOLT HAVING RESILIENTLY FLEXIBLE SHANK PORTION
Filed Nov. 16, 1959
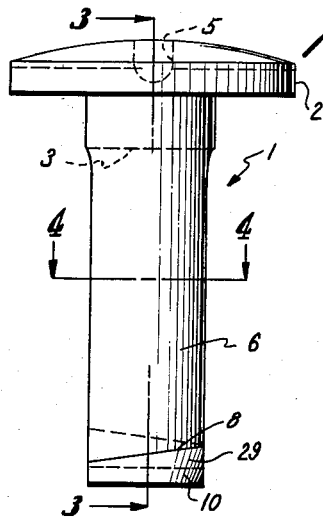
FIG. 1.
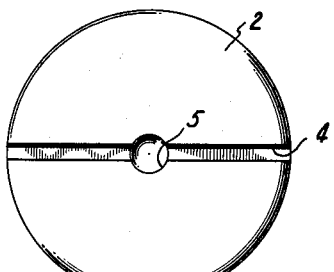
FIG. 2.
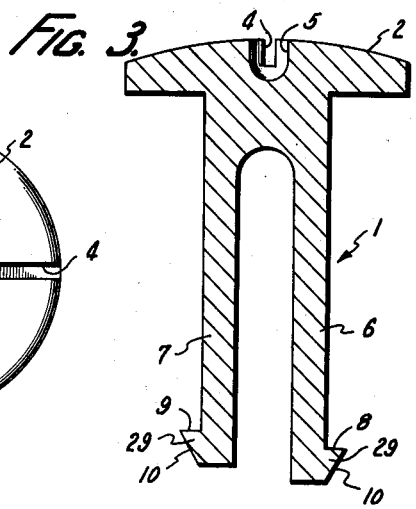
FIG. 3.
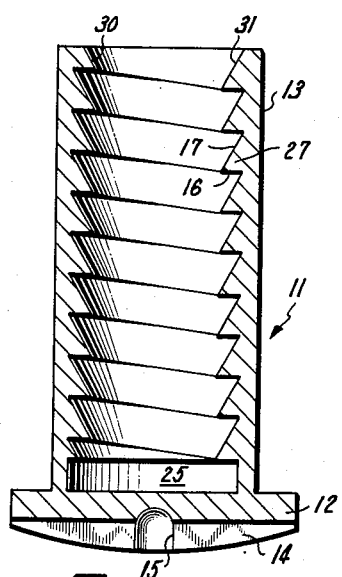
FIG. 6.
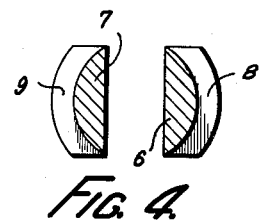
FIG. 5.
FIG. 4.
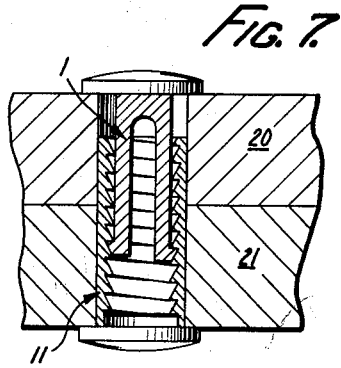
FIG. 7.
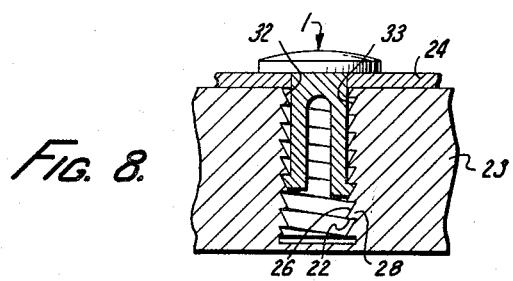
FIG. 8.
INVENTOR.
ARTHUR LEE JOHNSON
BY Christie, Parker & Hale
ATTORNEYS

United States Patent Office 3,115,804
Patented Dec. 31, 1963

3,115,804
SNAP BOLT HAVING RESILIENTLY FLEXIBLE SHANK PORTION
Arthur Lee Johnson, Madison, Wis., assignor to Wisconsin Alumni Research Foundation, Madison, Wis., a corporation of Wisconsin
Filed Nov. 16, 1959, Ser. No. 853,157
1 Claim. (Cl. 85—4)

This invention relates to a fastening device for detachably and adjustably connecting or fastening one part or member to another part or member of various and sundry devices and structural units.

The principal objectives of the present invention are to provide a fastener which may be placed in operative fastening position quickly and easily by application upon the fastener of longitudinal axial force, which may be disengaged easily in order that the members fastened together can be separated, and which permits adjustment of the clamping or holding pressure of the fastener.

There are snap fasteners and rivet fasteners in the prior art which may be placed in operative fastening engagement by application of longitudinal axial force, but snap fasteners and rivet fasteners, in general, have the disadvantage of not being adjustable as to their clamping or holding pressure. Rivet fasteners may also have the disadvantage that they cannot be disengaged easily in order to permit the members fastened together to be taken apart.

The common nut and bolt, although separable and also adjustable as to holding or clamping pressure, has the disadvantage that it cannot be placed in operative fastening position by a simple and quick longitudinal axial force applied to the bolt, but must be rotated with consequent loss of time and risk of damaging the fastened members by reason of the screwdriver, wrench or other torquing instrument slipping off the head of the bolt and impinging upon such members.

My invention combines the advantages without the disadvantages of the above-described common fasteners. My fastener may be placed in operative fastening position by a simple and quick thrust applied longitudinally of the bolt, thereby snapping it into position. No rotation of the bolt is necessary in order to place it in fastening position. This permits quick assembly, thus saving time. This also reduces the risk of scarring or otherwise damaging the members fastened together by reason of a screwdriver, wrench or other torquing tool slipping from the head of the bolt and impinging upon such members. After the bolt is in operative fastening position, rotation of the bolt or of its complementary mating member permits adjustment of the holding or clamping pressure of the bolt. Further rotation permits separation of the bolt from its complementary mating member so that the fastened members may be taken apart.

The invention will be more clearly understood by reference to the following detailed description thereof taken in conjunction with the accompanying drawings, in which:

FIG. 1 shows a side view of the bolt;

FIG. 2 shows a top view of the head of the bolt shown in FIG. 1;

FIG. 3 shows a longitudinal sectional view of the bolt taken along section 3—3 of FIG. 1;

FIG. 4 shows a transverse sectional view of the bolt taken along section 4—4 of FIG. 1;

FIG. 5 shows a perspective view of a modified form of the head portion;

FIG. 6 shows a sectional view along the longitudinal central axis of a complementary fastener sleeve for receiving the bolt shown in FIG. 1;

FIG. 7 shows the bolt of FIG. 1 and the fastener sleeve of FIG. 6 in operative position holding two members together; and FIG. 8 shows the bolt of FIG. 1 in operative position holding two members together without use of the fastener sleeve shown in FIG. 6.

FIGS. 1 through 4 show a bolt 1 which has a head portion 2 and a shank portion 3. The bolt may be constructed of any resilient materials such as metal or plastic. As shown in FIG. 2, the head portion contains a diametrical slot 4 to receive a screwdriver or other torquing tool, whereby torque may be applied to the bolt. The head portion also contains indentation 5 located at the center of the head to receive and key to the head ballpoint pliers or other tool for applying force to the bolt in a direction parallel to its longitudinal axis. The shank portion has two flexible legs or prongs 6 and 7 cantilevered from the head portion 2. The legs 6 and 7 terminate in lips 29 having transverse cam faces 8 and 9 and inclined wedge faces 10. An elongated longitudinal opening spaces legs 6 and 7 transversely of the longitudinal axis of the shank portion. The transverse dimension of the opening is sufficient to allow deflection of legs 6 and 7 adequate to permit lips 29 to clear the mating lips of an opening in an anchor member when the shank portion of the bolt is inserted in such opening by longitudinal movement. The longitudinal dimension of the opening is such that each leg may resiliently deflect an amount not less than the transverse dimension of one of the cam faces 8 or 9, this dimension being dependent on the physical properties of the material from which the bolt is made, the cross sectional area of the leg, the force applied, and the desired deflection of the leg, in accordance with commonly known design formulas for cantilever beams. If desired, the legs 6 and 7 may be cut away so that they are of substantially less transverse dimension than the diameter of the shank portion in order to increase flexibility of the legs. The reduced transverse dimension of the legs may extend through the cam faces 8 or 9, or, if it is desired to avoid reduction of holding strength, the reduced portion of the leg may extend only to the cam faces 8 and 9 so as not to reduce their area. The legs 6 and 7 are of predetermined unequal length equal to the pitch, or multiples thereof, of the hereinafter described helicoidal cam faces 8 and 9 and wedge faces 10 on the lips 29.

Cam faces 8 and 9 are helicoidal surfaces consisting of segments of a cylindrical right helicoid of constant predetermined pitch formed about the central longitudinal axis of the bolt. Wedge faces 10 are helicoidal surfaces consisting of segments of a cylindrical oblique helicoid formed about the same axis and having the same pitch as the cam faces 8 and 9 by a generating line or generatrix inclined toward the head portion of the bolt at a constant acute angle to the central longitudinal axis of the bolt, an inclination in the range of from 20° to 60° being satisfactory, with an inclination of 30° being preferred. As above-described, the cam faces 8 and 9 and wedge faces 10 are approximately segments of the commonly known buttress thread.

Although only two legs are shown in the preferred embodiment of the shank portion of the bolt, there may be a greater number of legs, such as 3 or 4 legs, equally spaced angularly about the central longitudinal axis of the bolt and having helicoidal cam and wedge faces as above-described for legs 6 and 7. Also, the lips 29 and cam faces 8 and 9 of the bolt may take various forms other than the above-described preferred embodiment, such as pins outstanding from the legs or indentations in the legs. Although it is preferred that the cam faces be segments of a cylindrical right helicoid, such need not be the case, and they may be segments of a cylindrical oblique helicoid. For greater holding strength of the bolt, there may be a plurality of engaging lips spaced longitudinally along each leg.

Referring to FIG. 6, there is shown a fastener sleeve 11 having a head portion 12 and a shank portion 13. The head portion contains a torquing slot 14 and a centrally located keying indentation 15 of the same nature and for the same purposes as previously described for the slot 4 and indentation 5 in head portion 2 of bolt 1. The shank 13 has a longitudinal opening concentric with its central longitudinal axis. The inner surface of the annulus formed by the opening in shank 13 has a continuous helical lip 27 formed therein concentrically with the longitudinal axis of the fastener sleeve. The lip 27 has helicoidal cam face 16 and wedge face 17. Wedge face 17 terminates in lands 30 and 31 at the end of the shank portion remote from the head portion.

Cam face 16 is a cylindrical right helicoid having the same pitch and substantially the same inner and outer diameters as the cylindrical right helicoid forming the cam faces 8 and 9 of the bolt. The inner and outer diameters of the right helicoid forming cam face 16 may be slightly greater than those of the right helicoid forming the cam faces 8 and 9 of the bolt for clearance, in accordance with customary machine shop practice. Wedge face 17 is a cylindrical oblique helicoid having the same pitch, inclination relative to the central longitudinal axis of the fastener sleeve, and substantially the same inner and outer diameters as the cylindrical oblique helicoid which forms the wedge faces 10 of the bolt, the inner and outer diameters of the oblique helicoid in the fastener sleeve being slightly greater than those of the bolt for clearance, in accordance with customary machine shop practice. As above-described, cam face 16 and wedge face 17 form approximately the commonly known buttress thread for engagement of cam faces 8 and 9 and wedge faces 10 of the bolt. If desired, a space 25 may be provided for clearance at the bottom of the opening in the shank of the fastener sleeve.

FIG. 5 shows a different configuration of the head portion 2 of the bolt. This configuration may also be given to the head portion 12 of fastener sleeve. Torque may be applied to the head through a wrench or other tool engaging the peripheral planar surfaces 18 of the head. Linear force may be applied in a direction perpendicular to the head by a tool keyed in proper position by the indentation 19 located at the center of the head. The head portion of either the bolt or fastener sleeve may be given various configurations such as flat head, round head or fillister head. Various other slots, spaces, or keys may be provided in the head portion in order that a torquing tool may be keyed to the head for application of torque to the head and a driving tool centered on the head for application of force to the head in a direction perpendicular to the head. A convenient modification would be to provide the head with the commonly known Phillips torque slot at its geometric center, which would provide both a keying indentation for a tool applying thrust perpendicular to the head and also a torque slot for a tool applying torque to the head.

Referring now to FIG. 7, bolt 1 and fastener sleeve 11 are shown in cooperative engagement fastening members 20 and 21 together. It is apparent that in order to place the bolt and fastener sleeve in operative fastening position, the shank portion 3 of the bolt may be forced into the opening in fastener sleeve 11 by a force applied to the bolt in the direction of its longitudinal axis, the legs 6 and 7 of the bolt resiliently deflecting inwardly as urged by the wedge faces 10 of the bolt slideably engaging the lands 30 and 31 and subsequently wedge face 17 of the fastener sleeve, which engagement produces on the legs an inwardly directed component of the longitudinal axial force. When the longitudinal motion of the bolt relative to the fastener sleeve brings cam faces 8 and 9 of the bolt in alignment with adjacent portions of cam face 16 of the fastener sleeve, the resilient nature of legs 6 and 7 causes them to deflect outwardly, thereby bringing such cam faces into overlapping engagement. Since the pitch of cam faces 8 and 9 is equal to the pitch of cam face 16, rotation of the bolt or of the fastener sleeve will cause the same to move in a direction parallel to its longitudinal axis. This permits adjustment of the clamping or holding pressure of the fastener and if desired, separation of the bolt from the fastener sleeve.

In FIG. 8, bolt 1 is shown in use without the employment of a fastener sleeve. A member 23, to which another member 24 is to be fastened, has an opening in it in which continuous helical lip 28 is formed. Lip 28 has helicoidal cam face 22 and wedge face 26 formed in its surface. Wedge face 26 terminates in lands 32 and 33. The lip 28, cam face 22, wedge face 26 and lands 32 and 33 are identical in shape to the above described lip 27, cam face 16, wedge face 17 and lands 30 and 31 of fastener sleeve 11, to which description reference is to be made for further details. The cam faces 8 and 9 and wedge faces 10 of the bolt cooperate with lands 32 and 33, cam face 22 and wedge face 26 of member 23 in the same manner as described above for FIG. 3, to which reference is to be made for further details, thereby detachably and adjustably fastening member 24 to member 25.

Although the preferred embodiment of my fastener calls for a continuous helicoidal cam face 16 or 22 in the anchor element receiving the bolt, such cam faces need not be continuous and may consist of segments of helicoidal surfaces. They may also have the configuration of various well known threads such as the acme thread, the U.S. standard, or the round or knuckle thread, which would necessitate that cam faces 8 and 9 on the bolt be of similar shape.

If desired, the legs 6 and 7 of the bolt may be permanently outwardly sprung a small amount transversely to the longitudinal axis of the bolt so that the lips 29 of the bolt are slightly farther apart than the corresponding lips 27 or 28 of the receiving sleeve 11 or member 23, respectively, for the bolt. Due to the resilient nature of the legs 6 and 7, this has the advantage of producing a bias of the lips 29 of the bolt against the mating lips 27 or 28 of the receiving sleeve or member, respectively, which inhibits rotation of the bolt and receiving sleeve or member relative to each other and thus prevents loosening of the bolt when it has been tightened in fastening engagement with the receiving sleeve or member.

I claim:

A fastener comprising a bolt and an anchor member, the anchor member defining an elongated opening therein, a helical screw thread formed in the walls of the opening in the anchor member and extending from the intersection of said opening with the exterior of the anchor member to the interior of the anchor member, said thread having a tooth profile comprising a cam face approximately perpendicular to the axis of the thread and a wedge face inclined relative to the axis of the thread, said cam face of the thread defining the lead of such thread, the bolt having a head portion and an elongated shank portion, the shank portion including a pair of elongated resiliently flexible legs extending parallel to each other from the head portion, the legs being spaced from each other transverse to the axis of the shank portion, said spacing of the legs being greater than twice the extent into the opening of the cam face of said thread in the opening and said legs being aligned transversely of their elongate extent, a lip adjacent the end of each leg extending outwardly from the shank transversely to the axis of the shank and arcuately about such axis, each lip defining a cam surface extending outwardly from the shank approximately perpendicularly to the axis of the shank and opening toward the head portion and extending arcuately about such axis, each lip further defining a wedge surface inclined relative to the axis of the shank and extending arcuately about such axis, the lips being axially offset such that the cam surface and wedge surface of each lip mate with the corresponding cam face and wedge face of the thread with the areal extent of the cam surface of the lips engaging the mating cam face of the thread, each leg having a smooth exterior surface extending between the lip and head portion which defines a portion of a cylinder having an axis substantially coaxial with the axis of the shank and a diameter substantially equal to the minor diameter of said cam surface, whereby the shank of the bolt may be thrust axially into the opening in the anchor member with resilient inward flexure of the legs of the shank to permit same so that the lip and thread cam faces engage and the bolt may be rotated in one direction to tighten it and rotated in the opposite direction to unscrew the bolt from the anchor member and separate the two.

References Cited in the file of this patent

UNITED STATES PATENTS

| | | |
|---|---|---|
| 771,336 | Thomson | Oct. 4, 1904 |
| 1,374,713 | Bell | Apr. 12, 1921 |
| 2,077,355 | Chaffee | Apr. 13, 1937 |
| 2,111,267 | Hoppenstand | Mar. 15, 1938 |
| 2,594,027 | Jakeway | Apr. 22, 1952 |

FOREIGN PATENTS

| | | |
|---|---|---|
| 628,316 | Great Britain | Aug. 26, 1949 |
| 312,604 | Switzerland | Mar. 29, 1956 |